Figure 1:
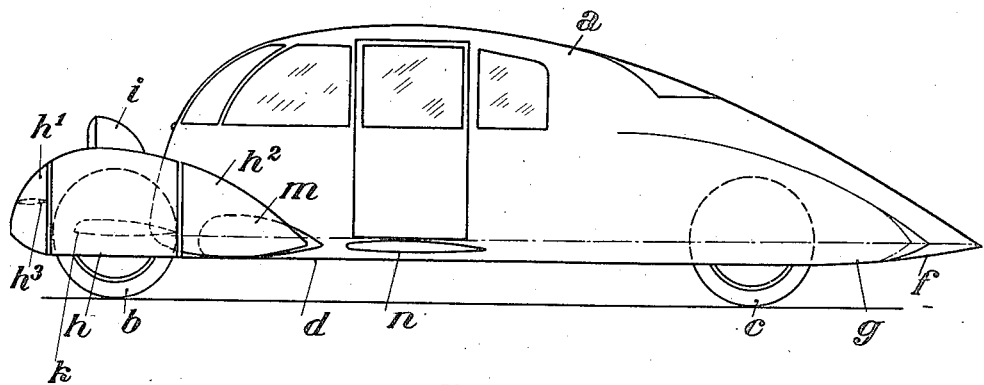

Jan. 13, 1925.

A. B. HENNINGER

POWER DRIVEN VEHICLE

Filed April 5, 1924

1,523,263

Inventor
Albert Berthold Henninger
by Knight Bros
attorneys

Patented Jan. 13, 1925.

1,523,263

UNITED STATES PATENT OFFICE.

ALBERT BERTHOLD HENNINGER, OF BERLIN-WILMERSDORF, GERMANY.

POWER-DRIVEN VEHICLE.

Application filed April 5, 1924. Serial No. 704,444.

*To all whom it may concern:*

Be it known that I, ALBERT BERTHOLD HENNINGER, residing at Berlin-Wilmersdorf, Prussia, Germany, have invented certain new and useful Improvements in Power-Driven Vehicles, of which the following is a specification.

This invention relates to motor driven vehicles of all kinds both for railways and roads. The object of the invention is to produce a vehicle to whose travel the least possible resistance is offered by the air. This is accomplished by giving the body of the vehicle substantially the shape of half the surface generated by the rotation of a stream line corresponding substantially to that of an elongated drop of fluid. Hence the shape of the body is such that radial sections through it have substantially the form of longitudinal central sections through a body generated by a generatrix whose periphery has the shape of a stream line, while horizontal sections through the body have the form of longitudinal sections of decreasing area through a body generated by a generatrix in the shape of a stream line. The shape thus produced is substantially similar to that of one-half of an elongated drop of fluid, the front of the body in which the seats are arranged being substantially closed. The sides of the body of the aforesaid shape are preferably somewhat depressed so as to make it better adapted for human occupants. The aforesaid body is preferably provided with a bottom that is flat at its widest portion but is curved near the end of the trunk of the body, the curvature increasing towards the end. The edges at which the body is connected to the bottom of its trunk are also rounded in accordance with the invention.

A further feature of the invention consists in making the other parts of the vehicle which are not situated within the trunk of the vehicle body in the shape of surfaces generated by a generatrix in the form of a stream line corresponding to that of an elongated drop of fluid. Thus, two thirds of each wheel is preferably enclosed in a surface of the said shape. This also applies to the axles that connect the pairs of wheels and that lie outside a trunk of the vehicle body. The steps and connecting portions which connect the casings of the wheels with the trunk also have stream line form.

The stream line casings of the wheels are preferably arranged so as to partly move and also turn laterally with the same. The parts of the casing that turn with the wheels may be arranged to carry the lights or projectors, these projectors being also encased in casings of stream line form. By thus arranging the projectors to turn with the wheels the light is always thrown in the direction in which the wheels are turned.

The wheels may be advantageously arranged entirely or partly in the trunk of stream line form of the vehicle body or they may be entirely or partly placed in projecting portions attached to the trunk.

The invention is shown by way of example in the drawing in which—

Figure 2:
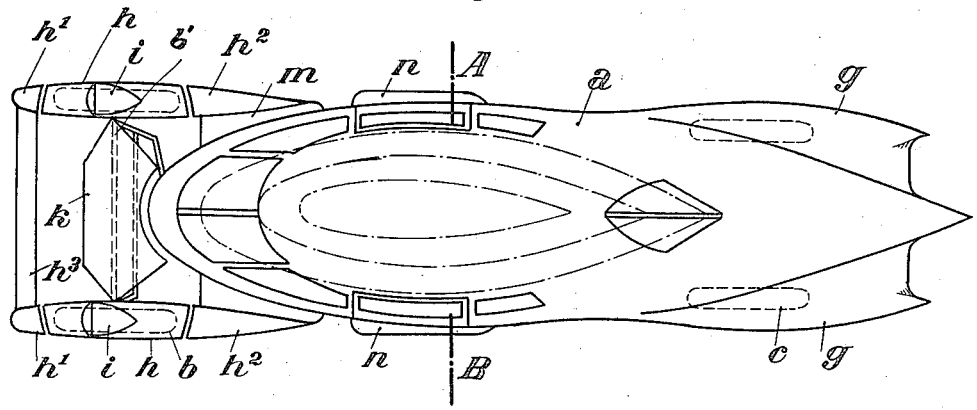
Figure 3:
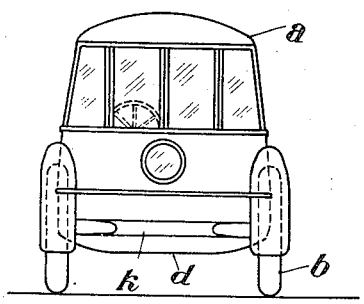
Figure 4:
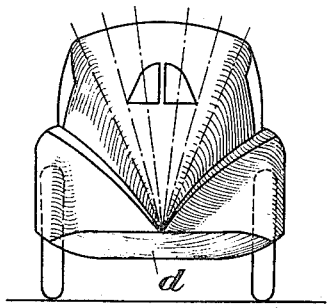

Fig. 1 is a side view,
Fig. 2 a plan view and
Fig. 3 a front view and
Fig. 4 a back view of the vehicle.

Referring to the drawing $a$ is the trunk of the vehicle body which travels on wheels $b$ and $c$. The periphery of the trunk as viewed from the side and above has the shape of a stream line. The entire trunk above the dash and dot line in Fig. 1 has the form of half a surface of revolution generated by a stream line, substantially similar to that of an elongated drop of fluid. The bottom of the trunk is substantially parallel to the ground except at the front and rear where it curves upwards. The bottom surface $d$ of the trunk $a$, that is the part beneath the dash and dot line is flat up to the point where the cross section is largest, that is up to the plane A—B, and at the rear it is curved, the curvature transversely of the vehicle increasing towards the end particularly at $f$. The trunk $a$ of the vehicle body has, as already mentioned, substantially the form of a surface generated by the rotation of a stream line but its sides are slightly depressed. Radial sections taken along the dash and dot lines indicated in Fig. 4 all have substantially the form of sections of half a body generated by the rotation of a stream line. Horizontal sections through the vehicle as represented in Fig. 4 have the form of sections of decreasing area through a body generated by the rotation of a stream line, but with slightly depressed sides. The rear wheels $c$ are partly arranged in projections or fins $g$ connected to the trunk of the vehicle body. The front wheels $b$ are arranged in casings $h$ in the front and rear of which there are separate small casings $h^1$ and $h^2$ respectively. These three casings $h$, $h^1$ and $h^2$ taken together, form a stream line body, preferably a body generated by the rotation of a stream line but with considerably depressed sides. The middle portion $h$ is arranged to turn with the wheels. Placed upon the middle portion is a casing $i$ of stream line form for the lamps or projectors. These projectors are thus arranged to turn with the wheels so that the light is always thrown in the direction in which the wheels are turned.

The front sections $h'$ of the casings that envelop the wheels are interconnected by a cross piece $h^3$ which also has the form of a stream line.

The front axle $b'$ is also enclosed in a casing $k$ of stream line form, this casing $k$ being bevelled at the sides so as to enable the wheels $b$ to be turned for the purpose of steering the vehicle. The cross piece $h^3$ may be connected to the trunk of the vehicle body in any desired way, such, for example, as by suitable supports (not shown) extending from casing $k$.

The section $h^2$ is connected to the trunk $a$ by a connecting piece $m$ whose periphery also has the form of a stream line. The steps $n$ are also of stream line shape. About two thirds of the wheels are enclosed in their casings or in the trunk of the vehicle.

I claim:—

1. In an automobile, a body, wheels for carrying the body, and in combination with said body a separate casing having stream line form closely housing some of said wheels.

2. In an automobile, a body, wheels for carrying the body, and in combination with a said wheel a casing having stream line form and closely surrounding the said wheel at least a half of its height.

3. In an automobile a body having substantially the form of half a surface generated by the rotation of a stream line, wheels for carrying the vehicle, and in combination with a said wheel a separate casing also having stream line form and closely surrounding the said wheel.

4. In an automobile, wheels for carrying the automobile, means for uniting two of said wheels, and a separate casing of stream line form, comprising the said means.

5. In an automobile, wheels for carrying said automobile, a main casing, an axle for two of said wheels, said axle having a portion thereof located outside of said main casing, and a second casing of stream line form for housing that portion of the axle outside of said main casing.

6. In an automobile, wheels for carrying the automobile and in combination with a said wheel, a casing having stream line form, and being divided into a plurality of parts, one of which being movable with the said wheels.

7. In an automobile, wheels for carrying the automobile and in combination with one of said wheels, a casing having stream line form, and being divided into three parts, one of which being movable with the said wheel, another arranged before the said wheel and the third behind the said wheel.

8. In an automobile, wheels for carrying the automobile and in combination with a said wheel, a casing having stream line form, with projections also of stream line form, wheels for carrying the vehicle and a part of said wheel being situated in a said projection.

9. In an automobile, wheels for carrying said automobile, and in combination with one of said wheels, a separate casing having stream line form and enclosing said wheel for two-thirds of its height.

In testimony whereof I have affixed my signature in presence of two witnesses.

ALBERT BERTHOLD HENNINGER.

Witnesses:
 WLAD. ENDERS,
 RYN. GRIFFITH.